April 20, 1926.
R. L. NAUGLE
RADIUS ROD CLAMP
Filed May 16, 1925
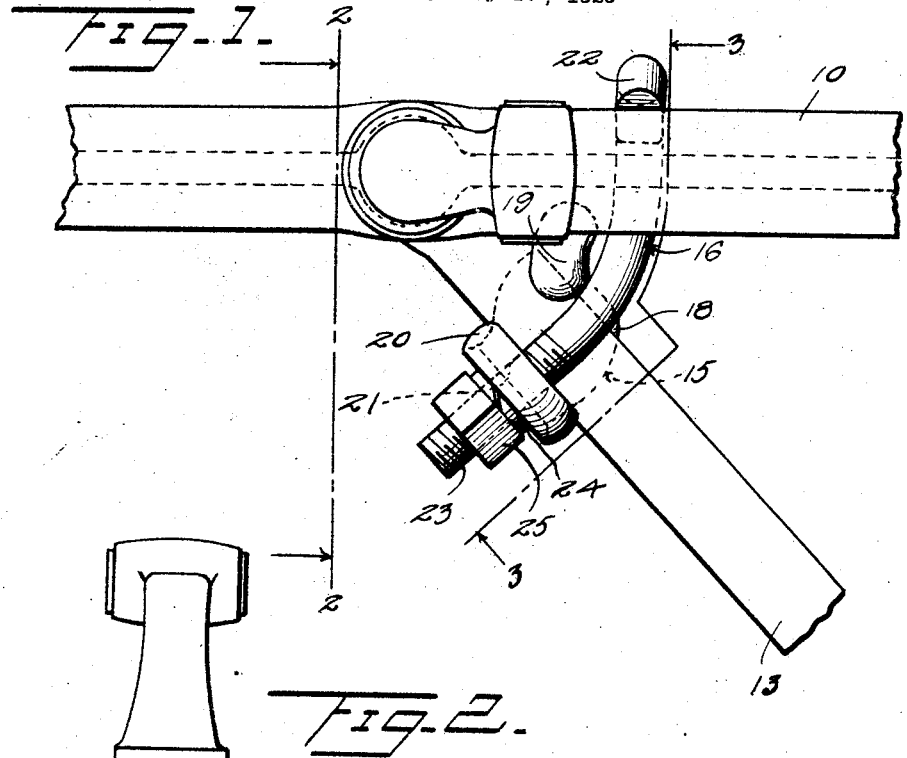
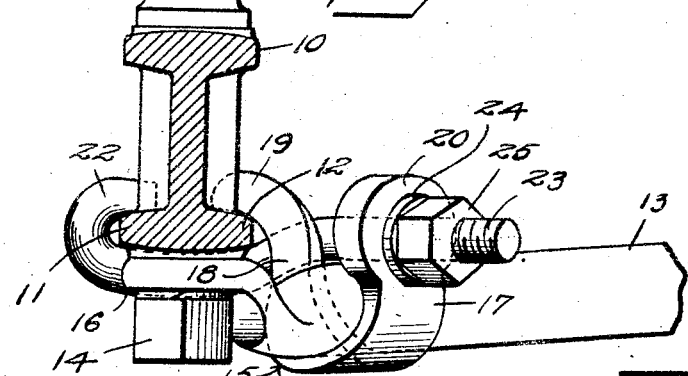
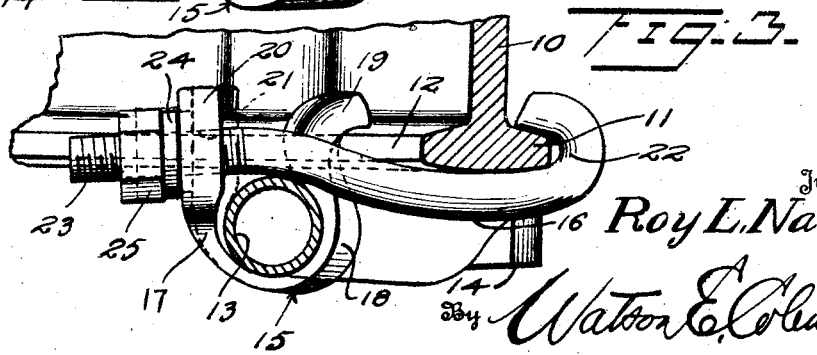
Inventor
Roy L. Naugle
By Watson E. Coleman
Attorney Patented Apr. 20, 1926.

1,581,283

UNITED STATES PATENT OFFICE.

ROY L. NAUGLE, OF BLACKSTONE, VIRGINIA.

RADIUS-ROD CLAMP.

Application filed May 16, 1925. Serial No. 30,819.

*To all whom it may concern:*

Be it known that I, ROY L. NAUGLE, a citizen of the United States, residing at Blackstone, in the county of Nottoway and State of Virginia, have invented certain new and useful Improvements in Radius-Rod Clamps, of which the following is a specification, reference being had to the accompanying drawings.

This invention relates to radius rod clamps and more particularly to a device for securely clamping the radius rod to the axle so that either complete or partial separation thereof is rendered impossible.

A further object of the invention is to provide a device of this character which will be very neat in appearance when applied and will have very little thereof exposed to view from the front of the vehicle.

A still further object thereof is to provide a device of this character which may be applied without drilling any holes either in the radius rod or the axle.

Another object of the invention is to provide a device of this character which may be cheaply and readily constructed and applied and which will be durable and efficient in service.

These and other objects I attain by the construction shown in the accompanying drawings, wherein for the purpose of illustration is shown a preferred embodiment of my invention and wherein:—

Figure 1 is a fragmentary plan view of an axle and an attached radius rod having a clamp constructed in accordance with my invention applied thereto;

Figure 2 is a section on the line 2—2 of Figure 1; and

Figure 3 is a section on the line 3—3 of Figure 1.

Referring now more particularly to the drawings, the numeral 10 indicates the axle of a vehicle having at its lower end oppositely extending flanges 11 and 12. Bolted to the under surface of this axle is a radius rod 13 inclining rearwardly from the axle. The radius rod is normally held in position by a nut 14 and when this nut becomes loosened, the radius rod is free to rattle and make an unpleasant noise and when the nut is lost, the radius rod falls, permitting undue movement of the axle and often causes serious accidents.

In accordance with my invention, I apply a clamp formed in two sections 15 and 16. The section 15 thereof is U-shaped and the arms 17 and 18 thereof have their adjacent faces spaced apart a distance sufficient to enable them to receive therebetween the radius rod 13. The end of one arm 18, which arm in the application of the device is arranged in the angle between the axle 10 and radius rod 13 is formed upon its upper end with an outturned hook 19 which, when the device is in applied position, overlies the inner flange 12 of the axle 10. The other arm has formed thereon an eye 20 having an opening 21 formed therein for the passage of the member 16. The member 16 is in the form of a bent hook bolt 22 with which is adapted to engage the outer flange of the axle 10 and the bend of which is such that while the hook is so engaged, the threaded end 23 of the bolt may be directed through the opening 21 of the eye 20, the bolt being passed about that side of the arm 18 remote from the forward or axle-engaging end of the radius rod 13. To this threaded end at the outer face of the eye 20, a lock washer 24 and a nut 25 are applied.

It will readily be seen that when this nut is tightened, the tension applied to the hook bolt will tend to straighten the hook bolt and to cause this hook bolt to bear firmly against the side of the arm 18, forcing the same toward the axle and toward the forward or axle-engaging end of the radius rod and thereby causing the hook 19 thereof to more firmly engage with the flange 12. This same tension serves to apply the hook 22 of the hook bolt more firmly to the flange 11 and to bend the upper end of the arm 17 inwardly upon the radius rod so that the upper ends of the arms 17 and 18 are spaced apart a distance less than the diameter of the radius rod and may not escape therefrom. The tension, thus applied, will very firmly force the outer end of the radius rod 13 against the under surface of the axle and will hold this radius rod against any movement whatsoever even though the nut 14 thereof be entirely removed.

Since the structure of the clamp is obviously capable of a certain range of change and modification without materially departing from the spirit of my invention, I do not limit myself to such specific structure except as hereinafter claimed.

I claim:—

1. In combination with an axle and a radius rod secured to the axle and diverging therefrom, the axle having forwardly and rearwardly extending flanges, a member embodying spaced arms receiving therebetween the radius rod and having upon that arm arranged in the angle between the axle and radius rod a hook engaging the rearwardly directed flange of the axle and means engaging the other arm of the member with one end and the axle with its opposite end for wedging the first named arm against the flange of the axle and deforming the last named arm to cause the same to overlie the radius rod and approach the first named arm so that the distance therebetween is less than the diameter of the radius rod.

2. In combination with an axle and a radius rod secured to the axle and diverging therefrom, the axle having forwardly and rearwardly extending flanges, a member embodying spaced arms receiving therebetween the radius rod and having upon that arm arranged in the angle between the axle and radius rod a hook engaging the rearwardly directed flange of the axle and means engaging the other arm of the member with one end and the axle with the opposite end for wedging the first named arm against the flange of the axle and deforming the last named arm to cause the same to overlie the radius rod and approach the first named arm so that the distance therebetween is less than the diameter of the radius rod, comprising a hook bolt having the hook thereof engaged with the forwardly directed flange of the axle and the threaded end thereof directed through an eye formed in the upper end of the last named arm, the hook bolt intermediate the hook and threaded end thereof being bent to pass about the first named arm whereby the application of strain to the threaded end of the hook bolt to draw the same through the eye will tend to straighten the hook bolt and to force the first named arm toward the axle and the axle engaging end of the radius rod.

3. In combination with an axle and a radius rod secured to the axle and diverging therefrom, the axle having a rearwardly extending flange, a U-shaped member receiving between the arms thereof the radius rod and having upon that arm arranged in the angle between the axle and radius rod a hook engaging the rearwardly directed flange of the axle, the other of the arms having upon its free end an eye and a bent member secured to the axle at one end and having its opposite end directed through the eye and a nut threaded to said member and engaging the outer face of the eye, said bent member extending upon that side of the first named arm remote from the point of connection between the axle and radius rod and receiving in the bend thereof the first named arm.

4. In combination with an axle and a radius rod secured to the axle and diverging therefrom, the axle having a rearwardly extending flange, a U-shaped member receiving between the arms thereof the radius rod and having upon that arm arranged in the angle between the axle and radius rod a hook engaging the rearwardly directed flange of the axle, the other of the arms having upon its free end an eye, a bent member secured to the axle at one end and having its opposite end directed through the eye and a nut threaded to said member and engaging the outer face of the eye, said bent member extending upon that side of the first named arm remote from the point of connection between the axle and radius rod and receiving in the bend thereof the first named arm, said axle likewise including a forwardly directed flange, said bent member having at is axle engaging end a hook for engagement with said forwardly directed flange to form a means of attachment between the axle and bent member.

In testimony whereof I hereunto affix my signature.

ROY L. NAUGLE.